United States Patent

Thuy et al.

[11] 3,936,867
[45] Feb. 3, 1976

[54] RECORD CARRIER, METHOD OF PRODUCING THE RECORD CARRIER AND METHOD FOR REPRODUCING STORED SIGNAL THEREFROM

[75] Inventors: Hans-Joachim Thuy; Gerhard Dickopp, both of Berlin, Germany

[73] Assignee: TED Bildplatten Aktiengesellschaft, AEG-Telefunken, TELDEC, Zug, Switzerland

[22] Filed: Jan. 28, 1974

[21] Appl. No.: 437,047

Related U.S. Application Data

[63] Continuation of Ser. No. 155,910, June 23, 1971, abandoned.

[30] Foreign Application Priority Data

June 23, 1970 Germany.......................... 2032269

[52] U.S. Cl..... 358/4; 179/100.4 ST; 179/100.41 K; 274/46 R; 346/1; 346/77 R
[51] Int. Cl.².... H04N 9/00; G11B 3/00; G11B 3/70
[58] Field of Search............ 274/46 R; 346/1, 77 R; 358/4; 179/100.4 ST, 100.41 K

[56] References Cited
UNITED STATES PATENTS

3,626,087   12/1971   Tomioka...................... 178/5.4 CD
3,652,809   3/1972   Dickopp et al. ............. 179/100.4 R

OTHER PUBLICATIONS

"Audio, Etc. – The Visible LP," E. T. Canby, *Audio*, June 1968, pp. 10 and 12.

*Primary Examiner*—Robert L. Griffin
*Assistant Examiner*—George G. Stellar
*Attorney, Agent, or Firm*—Spencer & Kaye

[57] ABSTRACT

A method of producing a record carrier with stored signals thereon and the record made thereby. The method comprises applying to a flexible record carrier hill and dale undulations which correspond to a broadband signal in the form of a frequency modulated carrier frequency oscillation, further applying at least one further signal of lower frequency superimposed on the broadband signal, and selecting an amplitude for the further signal such that in playback of the stored signals by a skid-shaped pickup operating by compression of the hills, even the lowest hills contact the skid-shaped pickup and are compressed thereby.

14 Claims, 6 Drawing Figures

RECORD CARRIER, METHOD OF PRODUCING THE RECORD CARRIER AND METHOD FOR REPRODUCING STORED SIGNAL THEREFROM

CROSS REFERENCE TO RELATED APPLICATION

This application is a continuation of application Ser. No. 155,910, filed June 23, 1971 now abandoned.

BACKGROUND OF THE INVENTION

The present invention relates to a method of producing a record carrier, the record carrier itself and a method of producing signals from such a record carrier.

In United States patent application Ser. No. 798,709 filed Feb. 12, 1969, by Gerhard Dickopp, Hans-Joachim Klemp, Horst Redlich and Eduard Schuller and now Patent No. 3,652,809, there is disclosed a system for reproducing signals recorded on a record carrier whose surface is provided with undulations corresponding to the variation of the signals with respect to time, and which is provided with a playback head having a contact element exerting a contact force upon the surface of the support moving by. This system is characterized by the fact that the playback head serves as a pressure sensing pickup excited by the time variation of the contact force corresponding to the deformations, the playback head having the shape of a transducer body mechanically biased in the direction of the contact force. The contact takes place either directly or via an essentially inherently rigid coupling piece. Preferably the elastic deformation of the surface of the carrier due to the contact force is considerably greater than the opposed lateral deflection of the contact element of the playback head due to the compression.

A carrier which yields elastically under the pressure of a pickup producing a high tracking force, was in direct contrast with the view then held by those skilled in the art that to raise as much as possible the upper frequency limit of the reproduction band, the record support should be as hard as possible and the pickup should be sprung as softly, i.e., as compliant as possible. The publication "Factors Affecting the Stylus/Groove Relationship in Phonograph Playback Systems" by G.R. Bastiaans in the *Journal of the Audio Engineering Society*, October 1967, Vol. 15, No. 4, pages 389 to 399 is a suitable example of this unfruitful conventional view with regard to the extension of the reproduction range towards higher frequencies. That publication contains a detailed exposition of the theory of these relationships and gives values of the upper limiting frequencies which can be reached for the kind of phonograph record play-back employed up to then.

A further coherent frequency range up to several MHz which, according to the results of experiments, offers the possibility for practical recording and reproduction and which is above the upper limiting frequency, regarded as insuperable, of the range which could be utilized with conventional means, was opened up by the method disclosed in the afore-mentioned application. That method employs a pick-up having a skid-shaped portion in engagement with the surface of the record and experiencing only a very small amplitude of movement while the undulations on the surface of the record containing the signal, on the other hand, experience considerably greater compressions. Thus, the possibility is afforded of recording and reproducing a broadband signal which may serve, for example, for the storage and reproduction of a television transmission. In this case, as mentioned, use is made of a skid-shaped pickup whose leading edge gradually approaches the surface of the record while its trailing edge is relatively steep so that the deformations rapidly pass out of range of contact with the pickup during the playback whereas they "creep" into the range of contact at the leading edge.

A frequency-modulated carrier frequency oscillation is generally recorded such that the amplitude of its undulations remain unaltered and all hills and dales of the undulations recorded are identical so that the skid-shaped portion of the pickup, which always covers several wavelengths of the carrier oscillation, also comes into contact with all hills, without one hill or the other being omitted, as could occur in amplitude modulation with hills of different heights. In this manner, the pickup records as a pressure pulse the departure of each individual hill out of its contact range with the "sharp" pickup trailing edge. The above description of the method according to the above-identified patent application is presented herein primarily because there is not yet any printed publication available about this system of so-called "pressure playback".

In the recently-developed method of the type described above because of the broad coherent working frequency band with an upper cut-off frequency of several MHz, a number of narrow-band signals can be stored by the known multi-channel technique, or a broadband signal, for example a video signal, which occupies the entire frequency range available, can be recorded and reproduced. In the latter case, the need may arise to accommodate one or more further signals, for example a sound signal or color signal, in the same recording.

The principle of pressure playback of a frequency-modulated carrier wave, which has been outlined broadly, appears at first to exclude the superimposition of an additional signal oscillation or modulated carrier wave, because the advantage of equal heights in the oscillation to be played back would be lost by such a superimposition. As a result of superimposing the beat of two signals to be recorded, conditions resembling amplitude modulation with different positions of the hills would possibly result so that the shaped pickup might no longer detect the undulation hills situated in dips in the beat curve.

SUMMARY OF THE INVENTION

It is an object of the present invention to provide a method of producing a record carrier, the record carrier itself, and a method of reproducing stored signals which obviate the difficulty mentioned above and enable one or more additional signal oscillations to be added to a broadband frequency modulated carrier signal without leading to the expected disturbances during the playback process.

According to a first aspect of the invention, there is provided a method of producing a record carrier with stored signals thereon comprising applying to a flexible record carrier hill and dale undulations which constitute a spatial representation of a broadband signal in the form of a frequency modulated carrier oscillation and at least one further signal of lower frequency than the frequency of the broadband carrier oscillation which is superimposed on the broadband carrier oscillation. The amplitude of the lower frequency signal is selected such that when the stored signals are reproduced by a skid-shaped pickup operating by compression of the hills, even the lowest hills contact the skid-shaped pickup and are compressed thereby.

According to a second aspect of the invention, there is provided a flexible carrier having stored signals thereon in the form of hill and dale undulations which represent a broadband carrier oscillation. The amplitude of the lower frequency signal is selected such that when the recording is played back by compression of the hills, even the lowest hills contact the skid-shaped pickup and are compressed thereby.

According to a third aspect of the invention, there is provided a method of reproducing signals stored on a record carrier in the form of hill and dale surface undulations corresponding to the signal magnitude of the signals with respect to time, the signals including a broadband signal in the form of a frequency modulated carrier oscillation and at least one further signal of lower frequency than the frequency of the carrier oscillation. The method involves engaging the record carrier surface undulations with a pickup including a contact face which exerts a compressive force on the record carrier and causing relative motion between the pickup and the record carrier, the pickup exerting such a pressure on the record carrier, the record carrier having such a modulus of elasticity and the amplitude of the further signal being so selected that the contact face of the pickup remains in engagement with even the lowest hills of the surface undulations.

DESCRIPTION OF THE PREFERRED EMBODIMENTS

Figure 1:
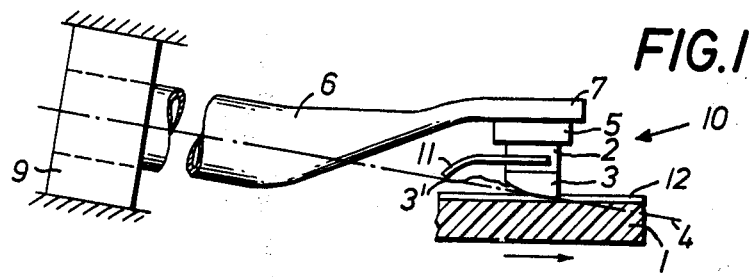
FIG. 1 is a schematic view of a system for pressure playback in which the method and record according to the invention are used.

Basically, in accordance with the invention, on a record having hill and dale undulations on its groove walls constituting a spatial representation of a stored signal, a broadband signal is recorded. The broadband signal is recorded as a frequency-modulated carrier frequency oscillation. In addition, at least one further signal of a lower frequency than the carrier frequency oscillation of the broadband signal is superimposed on the broadband signal, and its amplitude is selected to be so low, in relation to that of the broadband signal of higher frequency, that the pickup edge of a skid-shaped portion of a pickup used for reproduction, while detecting a plurality of hills of the higher frequency broadband signal projecting above the average heights of the hills and dales of the combined signal retains contact with the corresponding hills of the broadband signal which are located at a dale on the lower frequency signal recording and which are consequently situated below the average height of the hills of the combined signal.

As a result of this limitation, according to the invention, in the amplitude of a further signal in relation to the amplitude of the broadband signal, taking into consideration the compression of the frequency-modulated hill and dale deformations representing the broadband signal caused by the pickup pressure, it is possible to hold the trailing edge of the pickup, which acts substantially as a pressure sensor, always in contact with each individual hill of the broadband signal passing beneath the pickup. The occurrence of this effect gives a simple criterion for the correct adjustment and selection of the variable parameters, namely modulus of elasticity of the record support, size of the hill and dale deformations, length and shape of the pickup skid and the tracking force.

A graph of the behavior of the output voltage of the pickup can easily be recorded by means of an oscillograph. It can then be seen whether gaps in the playback signal of the higher frequency broadband oscillation occur in time with the lower-frequency additional signal oscillation, which would indicate an unsuitable selection of the parameter values. According to the invention there are to be no such playback gaps.

A record for use in a method according to the invention is characterized by the superimposition of one or more further signals on the broadband signal, which can be detected thereon. The wavelength of these further signals is no longer than the longest wavelength of the broadband signal, which corresponds to the lower limit of the frequency range of the broadband signal. The component amplitudes of these further signals are preferably lower than half the component amplitudes of the broadband signal. This simply means that the uninterrupted playback of all hills of the broadband signal achieved in the method according to the invention is achieved by a compression of those hills which are high as a result of the addition of a further signal to half their amplitude, so that a complete levelling of the hills of the broadband oscillation, is unnecessary.

In the pressure playback method disclosed and claimed in the above-identified patent application, the compressive force exerted by the pressure pickup is approximately proportional to the depth to which a hill is deformed, if it is assumed that it is deformed within its elastic range. In addition, however, the compressive force achieved is also proportional to the supporting area of the pickup. Since this area increases proportionately as the wavelength increases, and with the width of the recording track remaining constant, for example, in a groove, there is a frequency response with respect to the played-back signal of $1/\omega$, where $\omega$ is the angular frequency, in Radians/sec. Accordingly, lower frequency signals appear at the output of the pickup with a relatively high amplitude. If it is desired to obtain substantially equal amplitudes for all superimposed signals during the playback, then the spatial amplitude of the lower frequency oscillation can be lowered during recording by an amount dependent on the ratio of the two frequencies. This capability is beneficial for controlling the signal amplitude for the continuous playback of the hills of the broadband signal.

A record constructed according to the present invention is characterized in that the component amplitudes of one or more superimposed further signals are lower than the component amplitude of the broadband signal, in accordance with the inverse proportion of their wavelengths to the average wavelength of the broadband signal.

A further signal superimposed on the broadband signal may be a sound signal, a control signal or a color signal. For example, a sound signal in the form of a frequency-modulated carrier frequency oscillation is preferably used as such a further signal. A plurality of further signals, for example, a control signal and a color signal, may also be used with the broadband signal. It should be understood that it is then the amplitude ratio for the totality of the further signals which bears the above-described relationship to the component amplitude of the broadband signal.

In order to comply with existing television standards, the color signal may be a standardized chrominance carrier signal of the PAL, NTSC or Secam systems. That is, with the carrier frequency lowered by downward mixing so that it is below the frequency range of the broadband signal. According to these known systems, a suitable frequency for the chrominance carrier may be between 300 and 1000 Kcps.

In FIG. 1, a portion of a record 1 is illustrated in cross-section and corresponds to the record disclosed in the above-identified patent application. The record 1 is softer than records presently used for sound recordings. That is, within the region of the hill and dale undulations its modulus of elasticity may be below 20,000 kp (kiloponds)/cm$^2$, preferably even at or below 10,000 kp/cm$^2$. The record may be in the form of a circular disc similar to a conventional phonograph record or it may be in the form of a tape or strip. Contained within a groove 12 in the surface of the record 1 are the hill and dale undulations which contain the desired signals. The record 1 may be produced by a stamping process, by an injection-molding process or by a casting process as is the case with conventional phonograph records. The part of the record illustrated is caused to be displaced relative to a pickup 10 by means (not shown in the direction of the arrow shown. The pickup 10 includes a skid-shaped portion 3, a transducer 2, for example a piezo-ceramic crystal, and a damping member 5 of a material capable of absorbing oscillations. The output voltage generated is taken off from electrical coatings on the lateral sides of the transducer 2, through lines 11. The pickup 10 as a whole is secured to the flattened end 7 of a guide or tone arm 6. The other end of the tone arm 6 is secured by means of a resilient joint 9 to a carriage (not shown). The carriage can be of the type which permits the tone arm to advance along a radius of the record when the record is in the form of a disc.

As a result of the advance of the record 1 in the direction of the arrow, the hill and dale deformations in the grooves 12 come under the gradually sloping leading edge 3' at the left-hand side of the skid-shaped portion 3 of the pickup 10. However, no pulse-like pressure signal is produced by each undulation peak in the course of this initial engagement because of the gradual nature of the rise in pressure when the deformation peaks are pressed down. Such a pulse-like signal appears, however, when a hill deformation leaves the trailing edge 3'' of the portion 3, as shown in FIG. 2.

Figure 2:
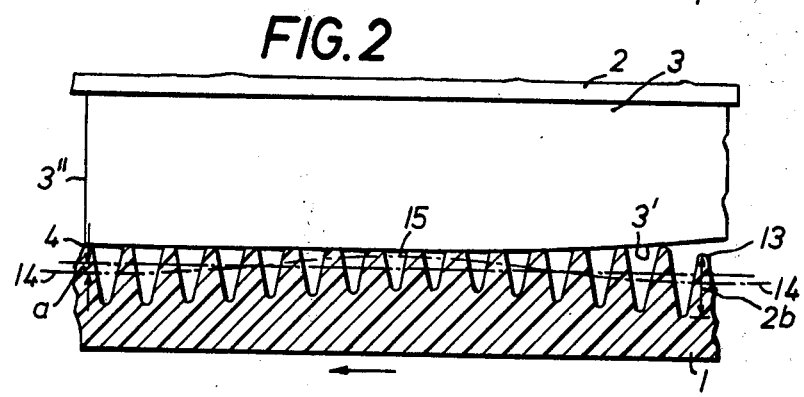
FIG. 2 is an enlarged cross-sectional schematic view of the skid-shaped portion of the pickup of FIG. 1 with a longitudinal section through a groove of the record, provided with undulations and two superimposed signals dimensioned according to the invention.

In FIG. 2, a section through the record 1, taken in the longitudinal direction of the grooves 12, is illustrated to an enlarged scale. The relative motion between the record 1 and the pickup 10 is again indicated by an arrow. The vertex 4 of the portion 3 is situated between the gradually sloping edge 3' and the trailing edge 3''.

It will be seen that, upon advancing of the record 1 relative to the pickup 10, the hills 13 of a frequency-modulated broadband signal gradually come into engagement with the sloping edge 3' and that this edge covers in length a relatively large number of hills or wavelengths. The hill 13 on the extreme right is still not in contact with the edge 13', the hill second from the right has just come into contact therewith, while all the hills further to the left are already compressed to various degrees. At the vertex 4, a hill is just passing out of range of the portion 3. The consequence of this will be an abrupt decrease in the pressure on the pickup 3.

The constant peak-to-peak amplitude component contributed by the broadband signal alone is designated by 2b. From FIG. 2, it can further be seen that, superimposed on the higher frequency broadband signal is a further lower frequency signal. The behavior of this lower frequency signal is represented by a sinusoidal dotdash line. This signal is composed of dales 14 and hills 15, one hill appearing near the center of FIG. 2. The superimposition is such that the dot-dash line becomes the base line of the broadband oscillation and the hills 13 of the broadband oscillation are no longer at a constant height in relation to the pickup 10. The instantaneous amplitude of the lower frequency signal is designated by a.

As a result of the tracking force of the pickup 10, the hills 13 of the broadband signal receive their greatest degree of compression when they engage vertex 4 while coinciding locally with a hill 15 of the lower-frequency signal. At that time, they are disposed at their highest level in relation to the pickup. As a result of the selection of the cooperating parameters, such as for example amplitudes 2b and a and the tracking force of the pickup 10 this compression, is to such a degree that the hill 13 on the extreme left of FIG. 2, which is close to the vertex 4 and which is in the middle of dale 14 of the lower frequency signal, and therefore is at the lowest level, still experiences a compression which is sufficient for the generation of a discernable pressure pulse.

This maintenance of the contact or of a slight compression even when the hills 13 coincide with a dale 14 of the lower-frequency signal oscillation is achieved, in particular, by the predetermined selection of a sufficiently low amplitude a of the lower-frequency oscillation and of a corresponding tracking force.

A numerical example will be useful to explain the necessary relationship. In this example, a luminance signal with a bandwidth of 8.5 MHz for example, a chrominance signal with a bandwith of 300 KHz and a sound signal with a bandwidth of 10 KHz are to be recorded. The luminence signal can be frequency-modulated first, in a manner known, per se, for example, with a frequency excursion of 1 MHz in the range from 3 to 4 MHz. The spatial amplitude b of the resulting FM recording on the record may amount to 1μ. Assuming a chrominance carrier frequency of about 500 KHz, the spatial amplitude of the corresponding recording can be reduced in the ratio of 500 KHz to 3.5 MHz, the latter being the center FM carrier oscillation frequency. Thus, in the present case, the chrominance signal is recorded with a spatial amplitude of 1/7μ. If a sound carrier frequency of 100 KHz is selected, its spatial recording amplitude could actually be lowered to 1/35μ.

In the case of sheets of conventional plastic material, for example polyvinyl chloride, tested for the purpose of pressure playback, these reductions in the additional signals are sufficient to ensure a continuous playback of the higher frequency signals in each case. The amplitude ratios given in the example apply for the case where electrical output signals which are equal in magnitude to one another are to be obtained for the various superimposed signals.

In many cases, for example in order to achieve a higher signal-to-noise ratio, it may be logical to obtain a different magnitude for one of the signals during the playback. In this case, the amplitude ratio must also be appropriately modified during the recording. In any event, the necessary condition for an uninterrupted mechanical playback is that the pickup 10 compress the hills 13 of the FM oscillation even when they coincide with the dales 14 of the lower frequency signals.

The chrominance signal mentioned in the example may be a standardized color signal, e.g. PAL, NTSC, Secam, with a reduced chrominance carrier frequency. During the reproduction, the signal is raised to the standardized chrominance carrier frequency value again by mixing the playback signal with an auxiliary signal.

Figure 3:
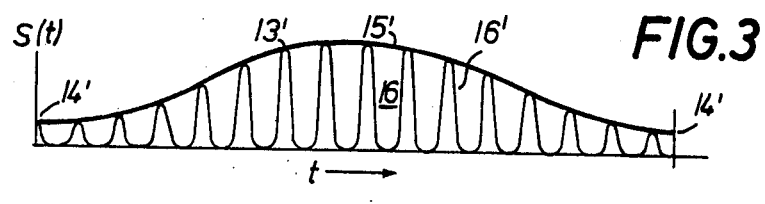
FIG. 3 is a graphic representation showing the case of uninterrupted playback of the hills of the higher frequency signal oscillation with the playback voltage plotted against time.

FIG. 3 is a graph showing the behavior with respect to time, $t$, of the electrical output quantity $S(t)$ from the transducer 2. The curve 16 is produced as the stylus vertex 4 travels from its illustrated position at the left-hand edge of the drawings toward the right-hand edge of the drawing. When a hill 13 in FIG. 2 leaves the pressure range of the portion 3, that is moves past vertex 4, there is a sudden reduction in the total compressive force exerted on the skid-shaped portion 3. The result is a voltage pulse 13' at the transducer 2. The height of each pulse 13' corresponds to the extent of the pressure reduction, that is to say, the extent of the previous compression of the corresponding hill 13. Therefore, the pulse train is amplitude-modulated with the lower frequency signal of the curve 14-15-14 in FIG. 2 so that the playback signal pulse train 16 also has a corresponding amplitude modulation and passes from a dale 14', through a hill 15' back to a dale 14', corresponding to the curve of the lower frequency signal in FIG. 2. The curve is continuous in that no gap, or blank space, occurs in the playback of the higher frequency signal. The two oscillations can therefore be separated by means of limiters and filters and reproduced completely in their original form.

Figure 4:
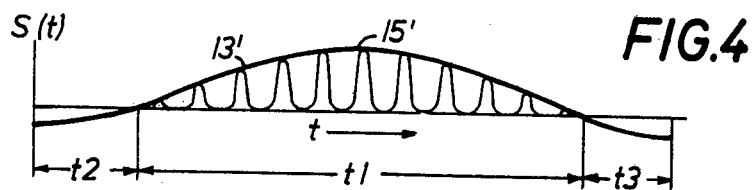
FIG. 4 is a graphic representation corresponding to FIG. 3, showing the case, avoided by the invention, of playing back the higher frequency signals with gaps.

The conditions are different in the corresponding illustration in FIG. 4. There it is assumed that, as a result of an erroneous selection of parameters, not made in accordance with the teaching of the invention, the vertex 4 does not retain any contact with hills 13 of the broadband oscillation for the periods of time $t2$ and $t3$. The result is that corresponding playback gaps occur in which there are no pulses 13' present. As a consequence, The signals cannot be completely recovered by the pickup, because information is only obtained therefrom during the interval of time $t1$.

Figure 5:
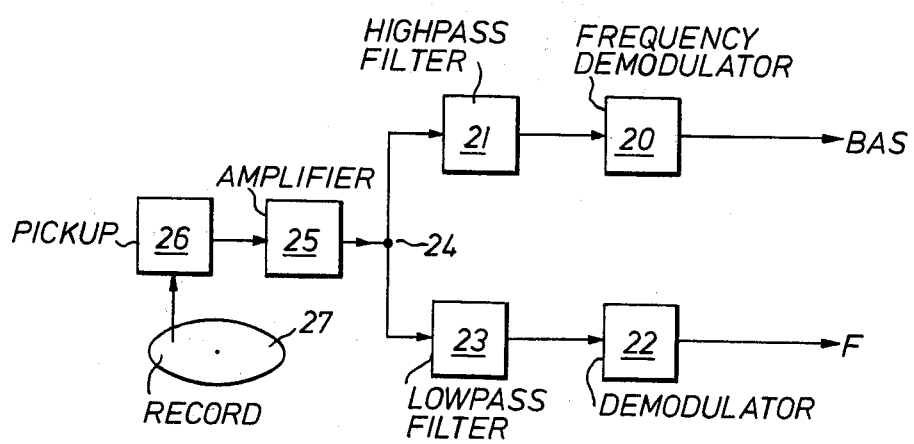
FIG. 5 is a block circuit diagram of an arrangement with which the method of the present invention can be realized.

FIG. 5 is a block circuit diagram of an arrangement with which the method of the present invention can be performed. The recorded signals are scanned by a pickup 26 from a record carrier 27, the pickup and carrier being shown in FIG. 1. Electrical signals furnished by the pickup 26 are amplified in amplifier 25. Two lines lead from a branch point 24, one to a highpass filter 21 and the other to a lowpass filter 23.

Figure 6:
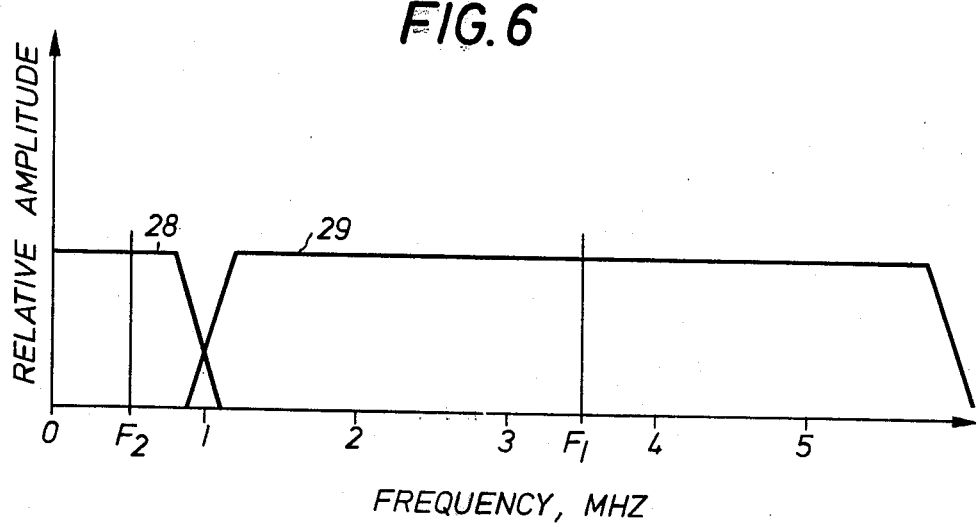
FIG. 6 is a schematic representation of a frequency spectrum of the playback signal for a record according to the invention.

The scanned signals might, for example, have a frequency spectrum as shown in FIG. 6. This includes the frequency spectrum 29 occupied by an oscillation signal which is composed of a carrier signal, whose frequency is $F_1$, frequency modulated with the luminance information of a color television signal. It also includes the frequency spectrum 28 occupied by the chrominance subcarrier oscillation, the subcarrier frequency being $F_2$ and being quadrature modulated — when the signal is an NTSC or PAL color television.

In the circuit of FIG. 5 the signals lying in the frequency spectrum 29, which signals contain the luminance information, are passed through the highpass filter 21 which strongly attenuates oscillations with a frequency of less than 1 MHz. Thus only oscillations in the frequency spectrum 29 reach the frequency demodulator 20. This demodulator 20 demodulates the frequency modulated carrier oscillation so that the black and white television signal BAS is produced.

The lowpass filter 23 essentially passes only those oscillations whose frequency is less than 1 MHz. These oscillations correspond to the quadrature modulated chrominance subcarrier, which is demodulated in demodulator 22 so that the color signal F is produced at its output. The black and white television signal BAS and the color signal F may control the color picture tube of a color television receiver once they have been sufficiently amplified.

The chrominance subcarrier signal having the frequency spectrum 28 may correspond to the standard chrominance subcarrier signal, only the carrier frequency $F_2$ being reduced to such an extent that it lies below the frequency excursion, or variation, range of the video luminance signal, whose frequency spectrum 29 extends from approximately 1 to 6 MHz. In the illustrated case, the chrominance subcarrier frequency $F_2$ is approximately 500 KHz.

The amplifier 25, filters 21 and 23 and the demodulator 22 may be circuit arrangements which correspond, in principle, to those currently employed in the television art. The frequency demodulator 20 may correspond to the frequency demodulators currently employed in video tape recorders.

The method according to the invention and the record intended for use in this method are particularly suitable for the recording or reproduction of a complete color television program with luminance signal, chrominance signal and sound signal, but the possibility of accommodating a plurality of further signals besides a broadband signal may also be used for other purposes.

It will be understood that the above description of the present invention is susceptible to various modifications, changes and adaptations, and the same are intended to be comprehended within the meaning and range of equivalents of the appended claims.

1. A method of producing a record carrier having signals mechanically stored thereon for use with a pickup means which is maintained substantially immovable in the direction of a force acting to maintain the pickup means in engagement with the record carrier, comprising the steps of: applying to a flexible, compressible record carrier hill and dale undulations constituting a spatial representation of a broadband signal in the form of a frequency modulated carrier oscillation and at least one further signal of lower frequency than the frequency of the broadband carrier oscillation; and imparting an amplitude to the lower frequency signal such that when the stored signals are played back by the pickup means, which operates by compression of the hills of the hill and dale undulations, even the broadband signal hills which coincide with dales of the further signal contact the pickup means and are compressed thereby, while the broadband signal hills which coincide with hills of the further signal are compressed less than completely thereby.

2. A method as defined in claim 1 wherein a video luminance signal constitutes the broadband signal and a sound signal constitutes the further signal.

3. A method as defined in claim 1 wherein a video luminance signal constitutes the broadband signal and a video control signal constitutes the further signal.

4. A method as defined in claim 1 wherein a video luminance signal constitutes the broadband signal and a video color signal constitutes the further signal.

5. A method as defined in claim 4 wherein the color signal is a standardized chrominance carrier signal with a carrier frequency which is lowered to below the excursion frequency range of the broadband signal.

6. A method as defined in claim 5 wherein the frequency of the chrominance carrier is between 300 and 1000 KHz.

7. A method as defined in claim 1 wherein a video luminance signal constitutes the broadband signal and a modulated carrier oscillation signal constitutes the further signal.

8. A method as defined in claim 7 wherein the modulated carrier oscillation is a frequency modulation.

9. In a flexible, compressible carrier having signals stored thereon in the form of hill and dale undulations for use with a pickup means which is maintained substantially immovable in the direction of a force acting to maintain the pickup means in engagement with the record carrier, the improvement wherein the undulations constitute a spatial representation of a broadband signal in the form of a frequency modulated carrier oscillation and at least one further signal of lower frequency than the frequency of the broadband carrier oscillation superimposed on the broadband carrier oscillation, and the amplitude of the lower frequency signal is such that when the recording is reproduced by the pickup means, which operates by compression of the hills of the hill and dale undulations and applying a predetermined contact pressure to said carrier, even the broadband signals hills which coincide with dales of the further signal contact the pickup means and are compressed thereby, and the broadband signal hills which coincide with hills of the further signal are compressed incompletely thereby.

10. A carrier as defined in claim 9 wherein the wavelengths of the further signal are longer than the longest wavelength of the broadband signal corresponding to the lower frequency limit of the frequency excursion range of the broadband signal.

11. A carrier as defined inclaim 9 wherein the component amplitudes of the spatial representation of the further signal are less than one-half the component amplitude of the spatial representation of the broadband signal.

12. A carrier as defined in claim 9 wherein the ratio of the component amplitudes of the spatial representation of the further signal to the component amplitude of the spatial representation of the broadband signal is substantially inversely proportional to the ratio of the wavelengths of the further signal to the average wavelength of the broadband signal.

13. A method of reproducing signals stored on an elastic, resiliently compressible record carrier in the form of hill and dale surface undulations constituting a spatial representation of the stored signals, which signals include a combination of a broadband signal in the form of a frequency modulated carrier oscillation and at least one further signal of lower frequency than the frequency of the carrier oscillation and whose spatial undulation amplitude bears a predetermined relation to the spatial undulation amplitude of the component representing the broadband signal, the carrier having a selected modulus of elasticity, comprising the steps of: engaging said record carrier surface undulations with a pickup means having a contact face; maintaining the pickup means relatively immovable in the direction of said engagement; causing relative motion between said pickup and said record carrier; and applying a force to the pickup means to cause the contact face to exert a compressive force on said record carrier sufficient to compress the undulation hills by an amount such that the pickup means contact face remains in engagement with, and compresses, even the broadband signal hills which coincide with dales of the further signal and incompletely compresses the broadband signal hills which coincide with hills of the further signal.

14. A method as defined in claim 1 wherein the longest wavelength of the spatial representation of the broadband signal has a value such that the pickup means is always in engagement with a large number of wavelengths of the broadband signal spatial representation.

* * * * *